United States Patent
Panitchakan et al.

(10) Patent No.: US 8,665,677 B1
(45) Date of Patent: Mar. 4, 2014

(54) DISK DRIVE MAGNETIC READ HEAD WITH AFFIXED AND RECESSED LASER DEVICE

(75) Inventors: Hathai Panitchakan, Muang (TH); Kittikom Nontprasat, Klongluang (TH); Prasertsak Naksakul, Muang (TH); Chupong Pakpum, Thanyaburi (TH)

(73) Assignee: Western Digital (Fremont), LLC, Fremont, CA (US)

( * ) Notice: Subject to any disclaimer, the term of this patent is extended or adjusted under 35 U.S.C. 154(b) by 24 days.

(21) Appl. No.: 13/330,325

(22) Filed: Dec. 19, 2011

(51) Int. Cl.
*G11B 11/00* (2006.01)

(52) U.S. Cl.
USPC .................................. 369/13.17; 369/13.13

(58) Field of Classification Search
USPC .......... 369/13.32, 13.33, 13.24, 13.22, 13.14, 369/13.13, 13.12, 13.02; 360/59, 125.31
See application file for complete search history.

(56) References Cited

U.S. PATENT DOCUMENTS

| | | | |
|---|---|---|---|
| 6,627,096 B2 | 9/2003 | Sherrer et al. | |
| 7,217,955 B2 | 5/2007 | Hamaoka et al. | |
| 7,502,397 B2 | 3/2009 | Naganuma | |
| 7,522,649 B2 | 4/2009 | Ha et al. | |
| 7,608,863 B2 | 10/2009 | Oda et al. | |
| 2002/0089913 A1 | 7/2002 | Moriyama et al. | |
| 2007/0015313 A1 | 1/2007 | Kwak et al. | |
| 2008/0056073 A1 | 3/2008 | Shimizu | |
| 2008/0316872 A1 | 12/2008 | Shimizu et al. | |
| 2009/0207580 A1 | 8/2009 | Oshika et al. | |
| 2009/0262448 A1* | 10/2009 | Shimazawa et al. | 360/59 |
| 2010/0020431 A1* | 1/2010 | Shimazawa et al. | 360/59 |
| 2010/0158059 A1 | 6/2010 | Yoshikawa | |
| 2010/0315736 A1* | 12/2010 | Takayama et al. | 360/59 |
| 2011/0122735 A1* | 5/2011 | Kato et al. | 369/13.14 |
| 2011/0267930 A1* | 11/2011 | Hurley et al. | 369/13.32 |

FOREIGN PATENT DOCUMENTS

JP 2008010026 A * 1/2008

* cited by examiner

*Primary Examiner* — Thang Tran

(57) ABSTRACT

A disk drive read head includes a slider. The slider has an air bearing surface, a trailing face, and a mounting face opposite the air bearing surface. The mounting face includes a mounting face recession. An interior surface of the mounting face recession includes an electrically conductive terminal. The read head also includes a magnetic transducer disposed on the trailing face of the slider. The read head also includes a laser device affixed to the electrically conductive terminal by a solder material. The laser device is at least partially recessed into the mounting face recession.

17 Claims, 6 Drawing Sheets

DISK DRIVE MAGNETIC READ HEAD WITH AFFIXED AND RECESSED LASER DEVICE

BACKGROUND

Magnetic hard disk drives retrieve and/or store data in computers and other consumer electronics devices. A magnetic hard disk drive includes one or more heads that can read and write information on a corresponding magnetic surface of a spinning disk. For convenience, all heads that can read are referred to as "read heads" or "heads" herein, regardless of other devices and functions the read head may also perform (e.g. writing, micro-actuation, flying height control, touch down detection, lapping control, localized disk media heating, etc). Each read head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface, a trailing face, and a mounting face that is opposite the ABS and that faces away from the ABS. A magnetic sensor and a plurality of head bond pads are typically disposed on the trailing face of the slider. The mounting face of the slider is typically permanently bonded to a tongue portion of the fragile laminated flexure by an adhesive, in a position such that the plurality of head bond pads are aligned with corresponding bond pads on the laminated flexure.

Conventionally, the head writes tiny magnetic transitions on the magnetic disk surface by applying sufficient magnetic field to the desired microscopic disk surface location to overcome the coercivity of the disk surface material there, and thereby change the remnant field there. However, market demand for disk drives having ever higher data storage capacity has motivated investigation into the possible use of "energy assisted" magnetic recording (EAMR), in which writing is accomplished not only by local application of a magnetic field, but also by local application of laser light for localized heating of the disk surface. EAMR may enable the writing of smaller transitions, and thereby increase the areal density of data stored on the disk surface.

Most proposed EAMR technologies require the addition of a laser light source on the read head, for example bonded to the back face of the slider. The laser light source must be attached to the read head in a precisely controlled position relative to the magnetic sensor. However, conventional structures and methods for attachment of a laser light source for EAMR to a read head may result in unacceptable relative position uncertainty or attachment unreliability. For example, solder or adhesive may permit the laser light source to undesirably move relative to the magnetic sensor before solder or adhesive hardening, and/or undesirably separate afterwards. Accordingly, there is a need in the art for improved structures and methods to attach a laser light source for EAMR to a read head.

DESCRIPTION OF EXAMPLE EMBODIMENTS

Figure 1:
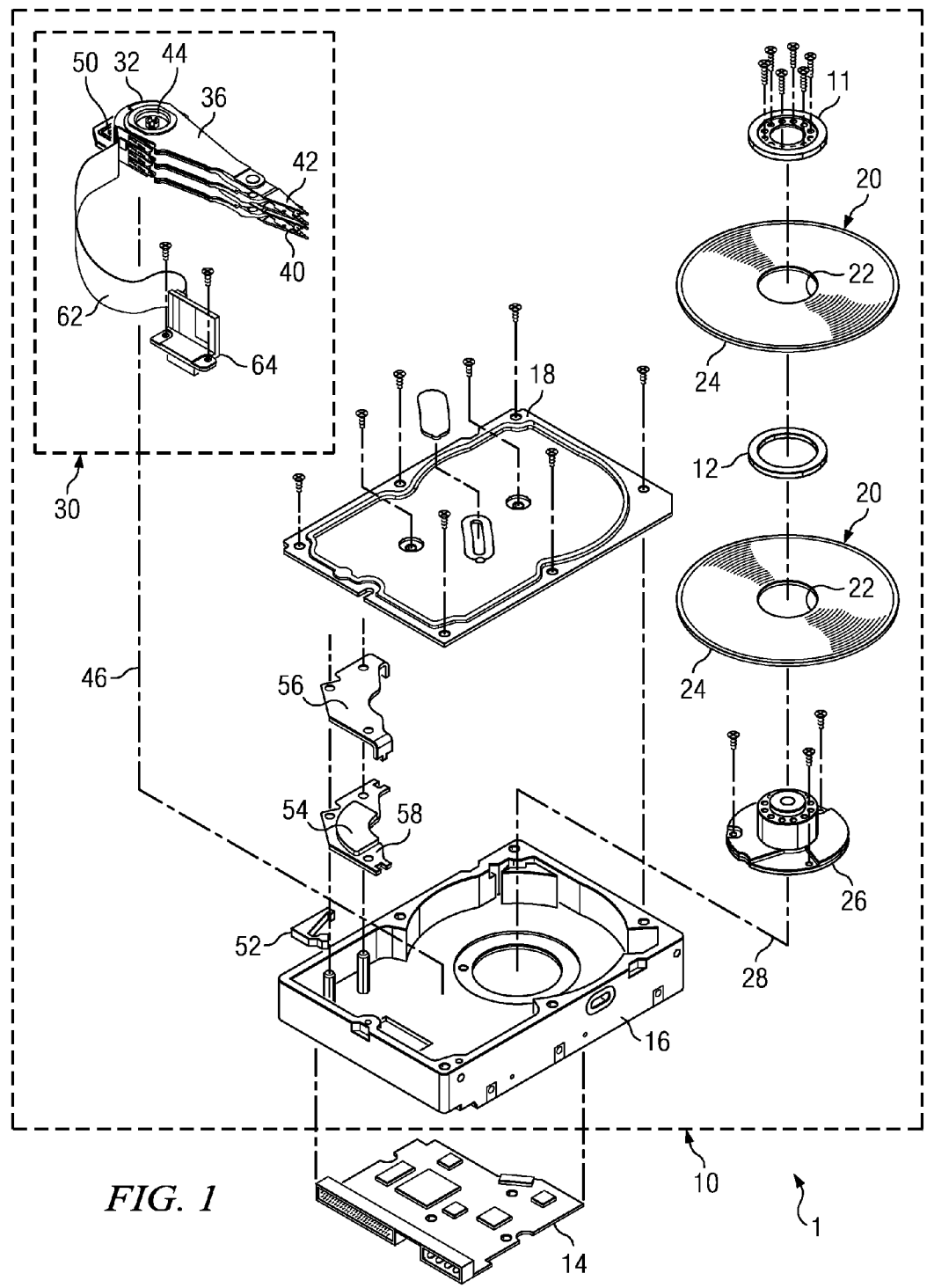
FIG. 1 is an exploded perspective view of a disk drive capable of including an embodiment of the present invention.

FIG. 1 is a perspective view of a disk drive 1 capable of including an embodiment of the present invention. The disk drive 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotably mounted to the disk drive base 16 by a spindle motor 26. The HDA 10 optionally includes one or more additional disks 20, also rotably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from aluminum, magnesium, beryllium, or stainless steel. The pivot bearing 44 may be retained in the bore by a tolerance ring or may be otherwise retained (e.g. by an adhesive). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 56 and a bottom plate 58, to form a voice coil motor (VCM). One or both of the top plate 56 and the bottom plate 58 may support a permanent magnet(s) of the VCM (e.g. permanent magnet 54). The top plate 56 and/or the bottom plate 58 preferably comprise a ferromagnetic metal so as to provide a return path for magnetic flux from the permanent magnet(s) through the yoke structure. The ferromagnetic metal yoke structure including the top plate 56 and the bottom plate 58 is preferably affixed to the disk drive base 16, for example by an adhesive, one or more fasteners, and/or magnetic attraction.

A plurality of head gimbal assemblies 42 may be attached to arms 36 of the actuator 32, for example by swaging. A flexible printed circuit (FPC) 62 (also known as a "flex cable") may also be attached to the actuator 32. Each of the head gimbal assemblies 42 may include a read head 40 that is bonded to a laminated flexure having a flexure tail that is electrically connected to the FPC 62. The FPC 62 can communicate electrical signals, via these electrical connections and via a flex bracket 64, between the head gimbal assemblies 42 and an external electronic system that is disposed on the PCB 14.

The actuator 32, head gimbal assemblies 42, and FPC 62 all may be considered as components of the HSA 30. The HDA 10 may have additional components that are not shown in FIG. 1. For example, the HDA 10 may also include a conventional head loading ramp (not shown), that may be positioned adjacent the disks 20 to facilitate merging of the head gimbal assemblies 42 onto surfaces of the disks 20.

Figure 2:
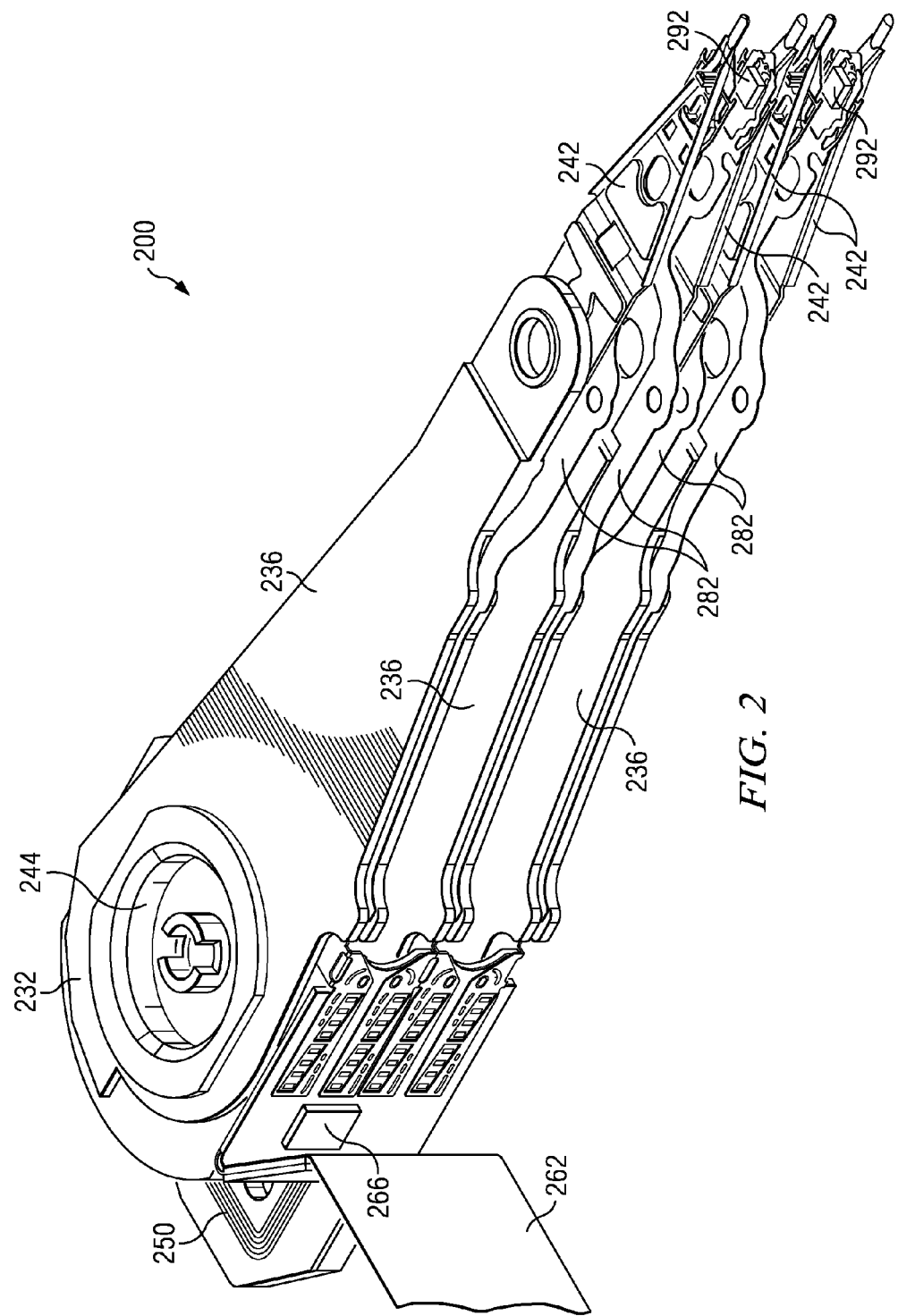
FIG. 2 is a top perspective view of a head stack assembly (HSA), according to an embodiment of the present invention.

FIG. 2 is a top perspective view of a head stack assembly (HSA) 200, according to an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, or stainless steel, or a relatively low mass density non-metallic or composite material having sufficient stiffness. The pivot bearing 244 may be retained in the bore by a tolerance ring or may be otherwise retained (e.g. by an adhesive). The actuator 232 includes a plurality of actuator arms 236 that extends away from the pivot bearing 244, and an actuator coil 250 that extends away from the pivot bearing 244 in a direction generally opposite the actuator arms 236.

In the embodiment of FIG. 2, a plurality of head gimbal assemblies (HGAs) 242 are shown to be attached to arms 236 of the actuator 232. Each HGA includes a read head 292 and a suspension assembly to which the read head 292 is attached. Specifically, each read head 292 is attached and electrically connected to a laminated flexure 282 of the suspension assembly of the HGA 242. The suspension assembly of each HGA 242 is shown to be attached to one of the actuator arms 236, for example by swaging. A flexible printed circuit (FPC) 262 is also shown to be attached to the actuator 232. Each laminated flexure 282 includes a plurality of conductive traces, and each laminated flexure 282 has a flexure tail that extends to the FPC 262, where the plurality of conductive traces is connected to the FPC 262 near a pre-amplifier chip 266.

Figure 3:
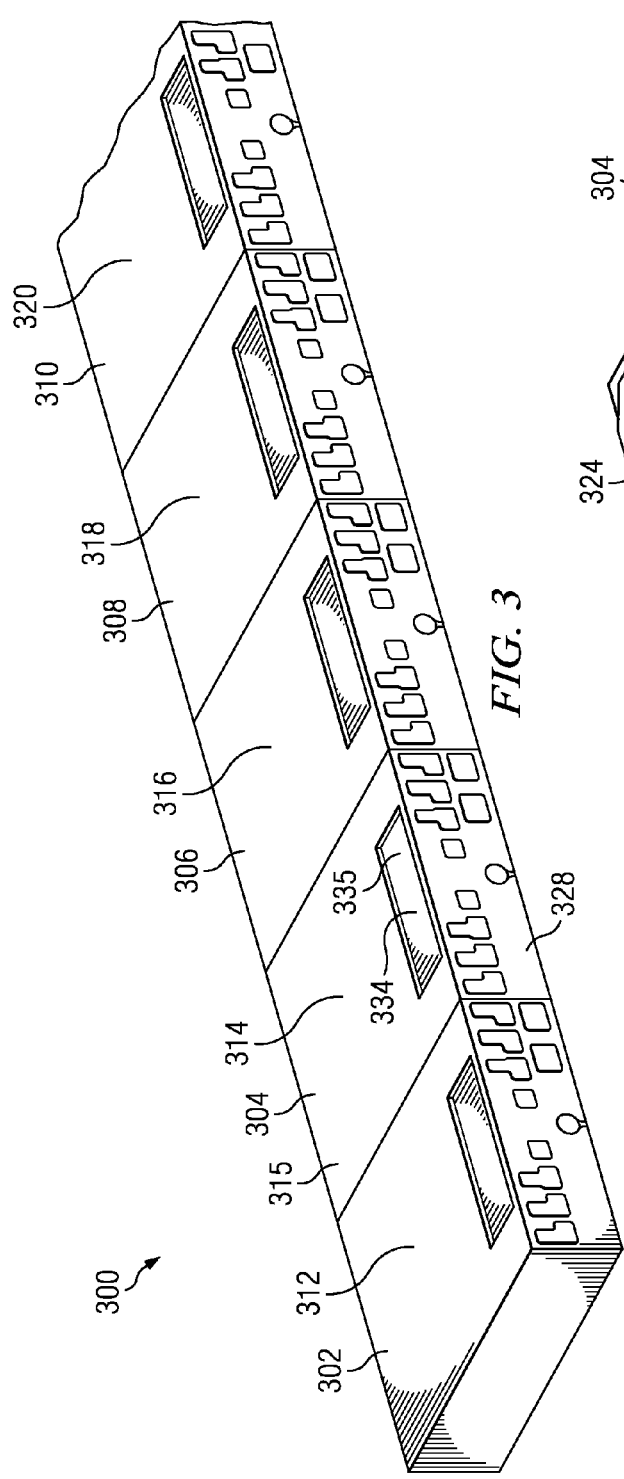
FIG. 3 depicts a row of heads according to an embodiment of the present invention, after the row is cut from a wafer but before individual heads are cut from the row, as viewed from a perspective angle towards the mounting surfaces of the heads.
Figure 4:
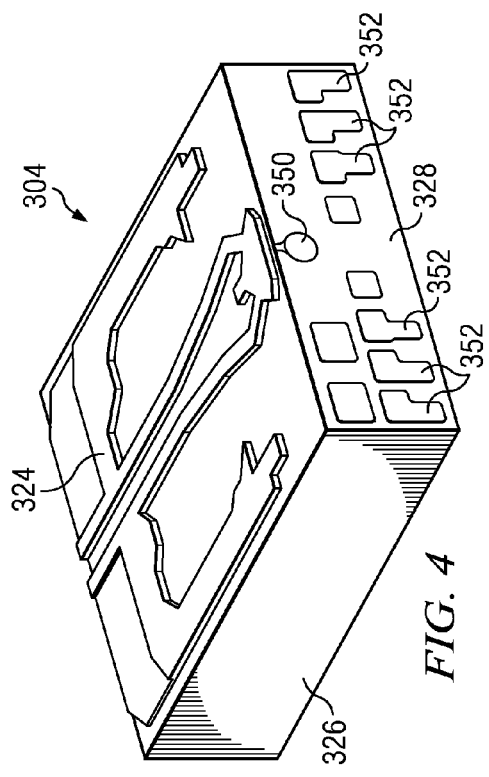
FIG. 4 depicts a head capable of use with an embodiment of the present invention, as viewed from a perspective angle towards the air bearing surface of the head.

FIG. 3 depicts a row 300 of read heads (including heads 302, 304, 306, 308, 310), according to an embodiment of the present invention, as viewed from a perspective angle towards the mounting surfaces (including heads 312, 314, 316, 318, 320) of the read heads. The row 300 of FIG. 3 is depicted after the row 300 is cut from a wafer (not shown) but before individual read heads (including read heads 302, 304, 306, 308, 310) are cut from the row 300. FIG. 4 depicts the read head 304 after it is cut from the row 300, as viewed from a perspective angle towards the air bearing surface 324 of the read head 304. The read head 304 is representative of the other read heads in the row 300 (e.g. heads 312, 316, 318, 320).

Now referring to the embodiment of FIGS. 3 and 4, the read head 304 comprises a slider 326 which includes the air bearing surface 324, a trailing face 328 that is normal to the air bearing surface 324, and the mounting face 314 (which is opposite but substantially parallel to the air bearing surface 324). The air bearing surface 324 may be of any conventional design, and is not restricted to the design shown in FIG. 4. The head 304 also comprises a plurality of head bond pads 352 that are disposed on the trailing face 328 and that are electrically conductive. The head bond pads 352 may comprise gold and/or copper, for example.

A magnetic transducer 350 is disposed on the trailing face of the slider 326. The magnetic transducer 350 may include a magneto-resistive read sensor (e.g. a tunneling magneto-resistive read sensor) and a magneto-inductive write transducer, for example. The slider 326 may comprise a ceramic material such as AlTiC, for example.

In the embodiment of FIG. 3, the mounting face 314 includes a mounting face recession 334. The mounting face recession 334 includes an interior surface 335 that is recessed relative to a major surface 315 of the mounting face 314 that is outside of the mounting face recession 334. The interior surface 335 preferably but not necessarily includes a metal coating, for example a metal coating to which solder can bond strongly. For example, the metal coating on the interior surface 335 may comprise a layer of gold or platinum having a thickness in the range 100 nm to 250 nm. Conductive adhesive may be used in place of the metal coating on the interior surface 335.

Figure 5B:
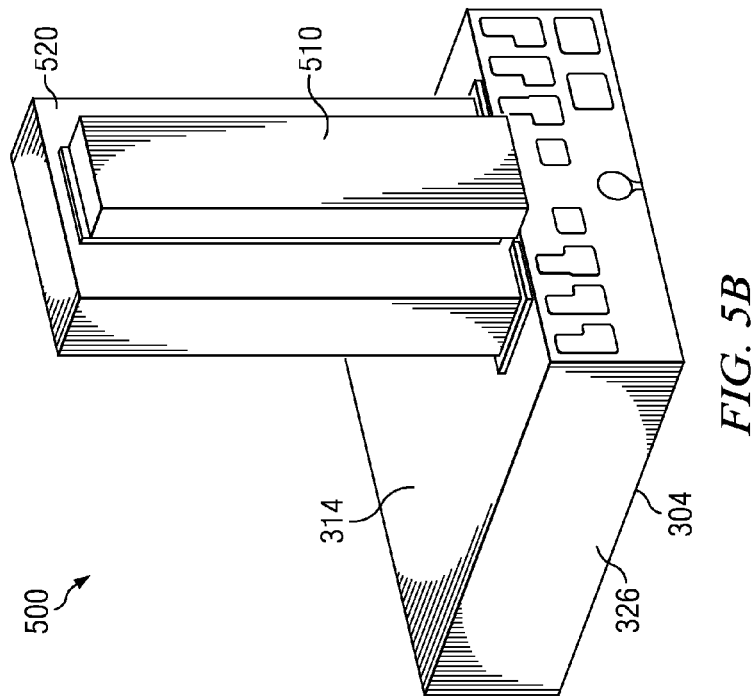
FIG. 5B is a perspective view of the HLSA of FIG. 5A, except with the laser device attached to the mounting surface of the head.
Figure 5A:
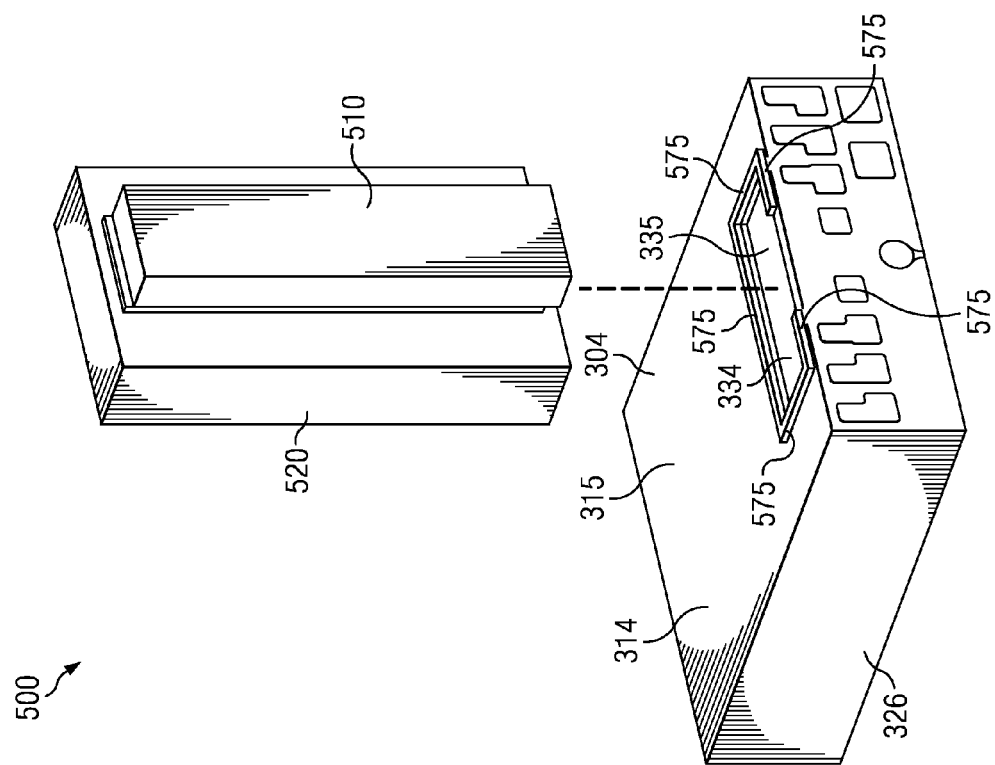
FIG. 5A is a perspective view of a head-laser submount assembly (HLSA) according to an embodiment of the present invention, having a laser device exploded away from the mounting surface of the head.

In the embodiment of FIGS. 5A and 5B, The depth of the mounting face recession 334 is preferably but not necessarily in the range 0.3 to 0.5 microns, measured from and normal to an adjacent region of the major surface 315 of the mounting face 314 that is outside the mounting face recession 334. In certain embodiments, the depth of the mounting face recession 334 is preferably not made deeper that this range, so that the mounting face recession 334 is less likely to adversely affect the desired crown or camber of the slider 326. Preferably, not more than half of the mounting face recession depth is filled with the metal coating on the interior surface 335.

FIG. 5A is a perspective view of a head-laser submount assembly (HLSA) 500 according to an embodiment of the present invention, having a laser device (e.g. a laser diode 510 with submount 520) exploded away from the mounting surface 314 of the head 304. FIG. 5B is a perspective view of the HLSA of FIG. 5A, except with the laser device (e.g. a laser diode 510 with submount 520) attached to the mounting surface 314 of the head 304. Specifically, in the embodiment of FIG. 5B the laser submount 520 is affixed to the interior surface 335 of the mounting face recession 334 in the mounting surface 314 by a bonding material (e.g. solder), so that the laser submount 520 is at least partially recessed into the mounting face recession 334. Preferably but not necessarily, the solder material (e.g. tin solder) defines a solder material thickness in the range 1 micron to 2.5 microns.

In the embodiment of FIG. 5A, the mounting face recession 334 includes a plurality of recession edges 575. Preferably but not necessarily, a maximum clearance between the laser submount 520 and a nearest one of the plurality of recession edges 575 is less than 10 microns. For example, if the face of the laser submount 520 that faces the mounting face recession 334 is rectangular with 200×400 microns dimensions, then the dimensions of the mounting face recession 334 preferably but not necessarily does not exceed 220×420 microns.

In certain embodiments, it is desired that the bonding material (e.g. solder) does not extend beyond any of the plurality of recession edges 575, for example to prevent contamination of other areas of the head 304. Also, in certain embodiments, the structural features and/or dimensional ranges or inequalities described in the previous two paragraphs may provide improved relative position certainty or attachment reliability relative to conventional structures and methods for attachment of a laser light source for EAMR to a read head.

Figure 6A:
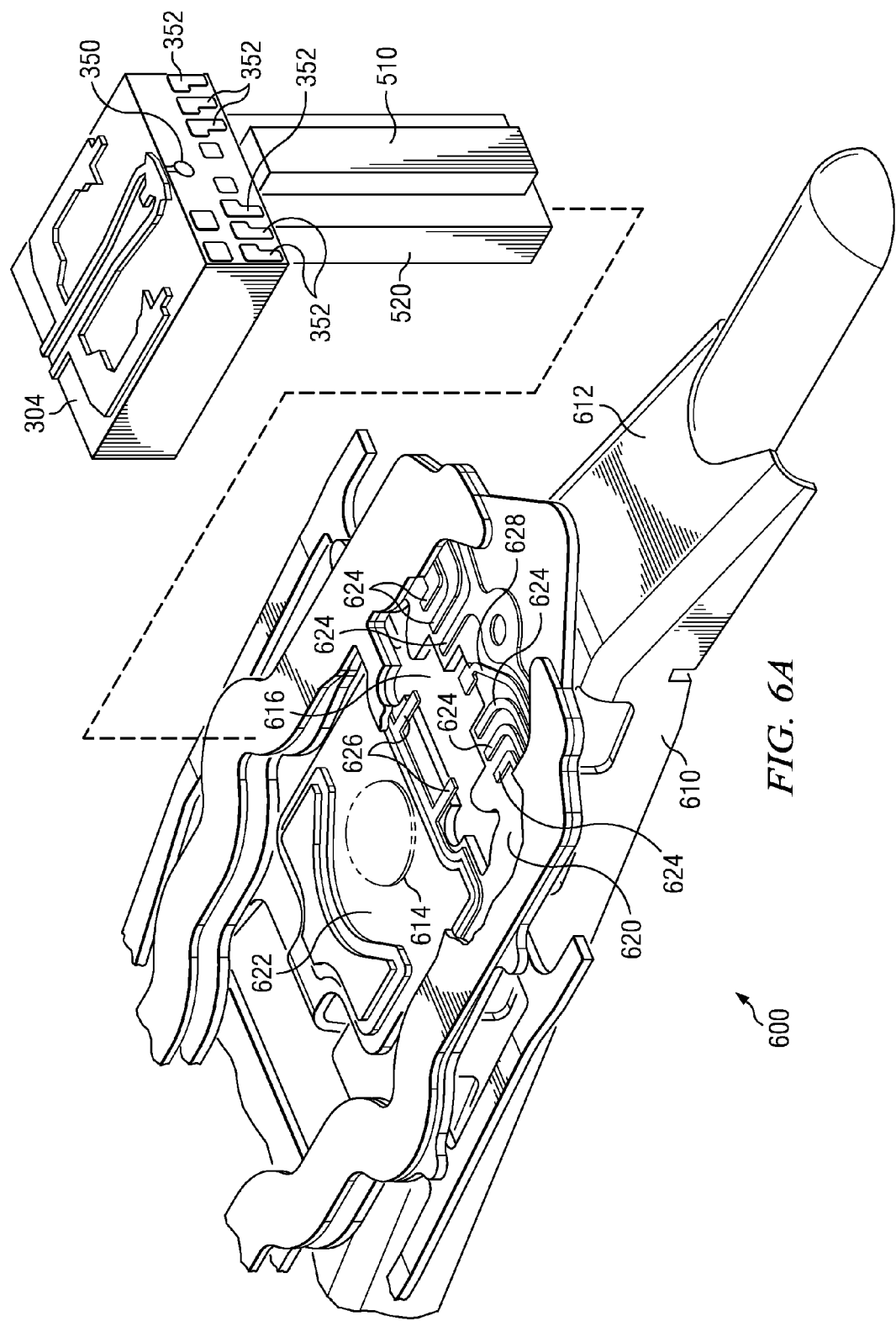
FIG. 6A is a perspective view of the distal portion of a head gimbal assembly (HGA) according to an embodiment of the present invention, with a head (with mounted laser device) being exploded away from the suspension assembly.
Figure 6B:
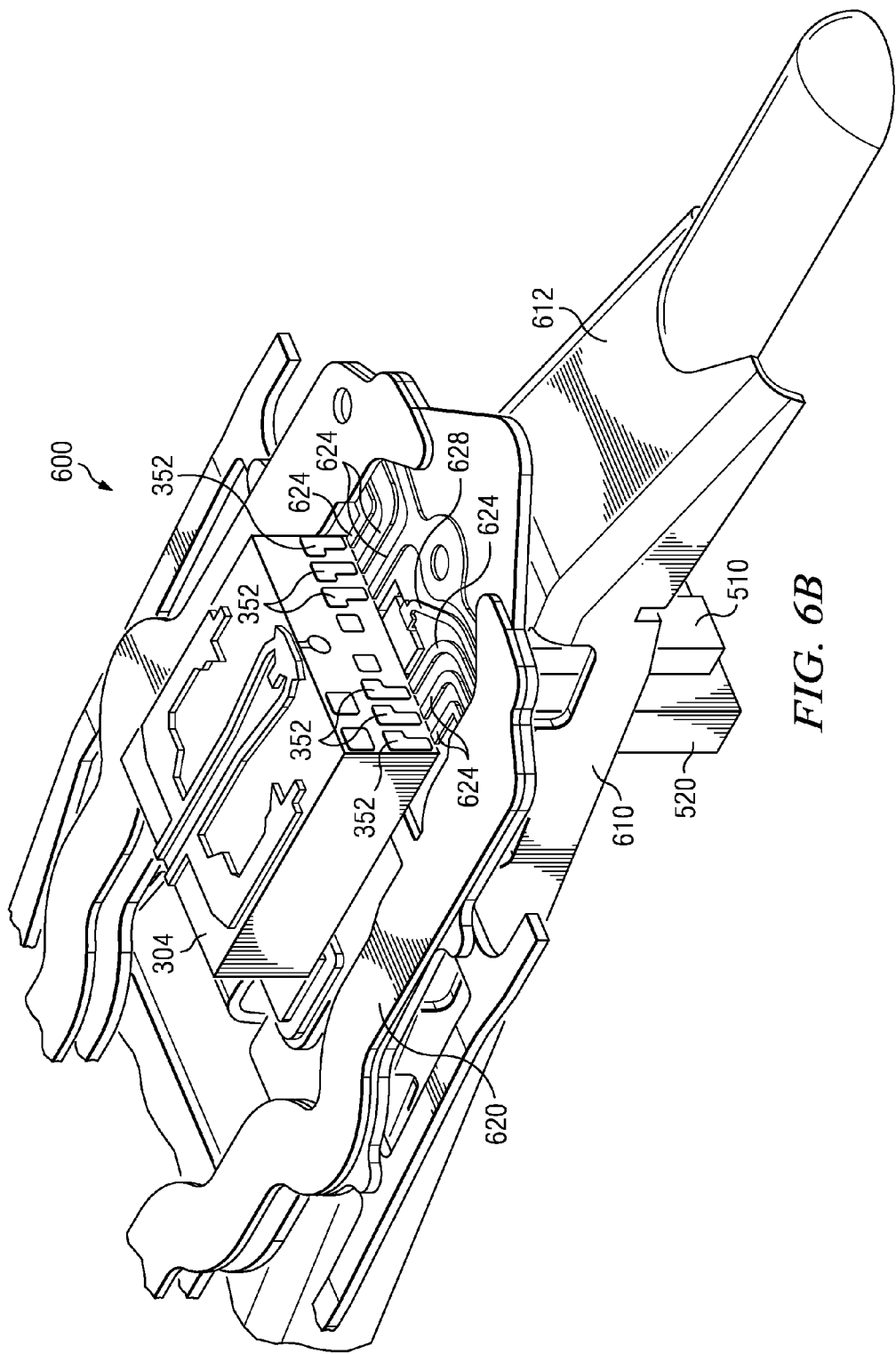
FIG. 6B is a perspective view of the distal portion of a head gimbal assembly (HGA) of FIG. 6A, except with the head being attached to a tongue of the suspension assembly.

FIG. 6A is a perspective view of the distal portion of a head gimbal assembly (HGA) 600 according to an embodiment of the present invention, with a head 304 (and mounted laser diode 510 and laser submount 520) being exploded away from a suspension assembly 610 of the HGA 600. FIG. 6B is a perspective view of the distal portion of the HGA 600 of FIG. 6A, except with the head 304 being attached to a tongue 622 of the suspension assembly 610.

Now referring to the embodiment of FIGS. 6A and 6B, the suspension assembly 610 comprises a load beam 612 and a flexure 620. The flexure 620 includes a tongue 622 on which the read head 304 may be mounted. A first side of the tongue 622 may be in contact with the load beam 612, for example via a conventional dimple 614 that transfers a preload force (also known as a "gram load") from the load beam 612 to the head 304 to preload the head 304 against the surface of a rotating disk during disk drive operation.

Still referring to the embodiment of FIGS. 6A and 6B, the flexure 620 is a laminar flexure that includes a patterned electrically conductive layer that has six conductive traces 624, two conductive traces 626, and a conductive trace 628. The conductive traces may comprise copper, for example. The magnetic transducer 350 is electrically accessed through a subset of the head bond pads 352. Each of the head bond pads 352 is preferably electrically connected to a respective one of the conductive traces 624 by a conductive ball (not shown), for example by gold ball bonding or other applicable conventional methods. Hence, in the embodiment of FIG. 6A, the magnetic transducer 350 is electrically connected to a subset of the conductive traces 624, but is not connected to the conductive traces 626 or 628.

As shown in FIGS. 6A and 6B, the laser diode 510 passes through the opening 616 in the suspension assembly 610, and the laser diode 510 is electrically connected to (by making electrical contact with) at least the conductive trace 628, but is not connected to the conductive traces 624. The laser diode 510 may be electrically connected to the conductive traces 626, via a conductive path on or through the laser submount 520 that contacts the conductive traces 626. The conductive traces 624, 626, and 628 extend along the flexure 620, via an elongated flexure tail to electrical connections with an actuator flexible printed circuit (e.g. FPC 262, as shown in FIG. 2).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A read head comprising:
a slider having an air bearing surface, a trailing face that is normal to the air bearing surface, and a mounting face that is opposite but substantially parallel to the air bearing surface, the mounting face including a mounting face recession, the mounting face recession including an interior surface that is recessed relative to a major surface of the mounting face that is outside of the mounting face recession;
a magnetic transducer disposed on the trailing face of the slider; and
a laser device affixed to the interior surface by a bonding material, the laser device being at least partially recessed into the mounting face recession;
wherein the major surface of the mounting face substantially surrounds the mounting face recession, and
wherein the interior surface includes a metal coating that comprises gold or platinum.

2. A read head comprising:
a slider having an air bearing surface, a trailing face that is normal to the air bearing surface, and a mounting face that is opposite but substantially parallel to the air bearing surface, the mounting face including a mounting face recession, the mounting face recession including an interior surface that is recessed relative to a major surface of the mounting face that is outside of the mounting face recession;
a magnetic transducer disposed on the trailing face of the slider; and
a laser device affixed to the interior surface by a bonding material, the laser device being at least partially recessed into the mounting face recession;
wherein a depth of the mounting face recession is in the range 0.3 to 0.5 microns, measured from and normal to an adjacent region of the major surface.

3. A read head comprising:
a slider having an air bearing surface, a trailing face that is normal to the air bearing surface, and a mounting face that is opposite but substantially parallel to the air bearing surface, the mounting face including a mounting face recession, the mounting face recession including an interior surface that is recessed relative to a major surface of the mounting face that is outside of the mounting face recession;
a magnetic transducer disposed on the trailing face of the slider; and
a laser device affixed to the interior surface by a bonding material, the laser device being at least partially recessed into the mounting face recession;
wherein the interior surface includes a metal coating; and
wherein the metal coating comprises a layer of gold having a thickness in the range 100 nm to 250 nm.

4. A read head comprising:
a slider having an air bearing surface, a trailing face that is normal to the air bearing surface, and a mounting face that is opposite but substantially parallel to the air bearing surface, the mounting face including a mounting face recession, the mounting face recession including an interior surface that is recessed relative to a major surface of the mounting face that is outside of the mounting face recession;
a magnetic transducer disposed on the trailing face of the slider; and
a laser device affixed to the interior surface by a bonding material, the laser device being at least partially recessed into the mounting face recession;
wherein the mounting face recession defines a plurality of recession edges, and wherein a maximum clearance between the laser device and a nearest one of the plurality of recession edges is less than 10 microns.

5. The read head of claim 4, wherein the bonding material does not extend beyond any of the plurality of recession edges.

6. A disk drive comprising:
a disk drive base;
a disk rotably attached to the disk drive base;

an actuator pivotably attached to the disk drive base, the
actuator including an arm;
a suspension assembly attached to the arm, the suspension
assembly including a flexure having a plurality of conductive traces;
a read head mounted on the flexure, the read head including
a slider having an air bearing surface, a trailing face that
is normal to the air bearing surface, and a mounting
face that is opposite but substantially parallel to the air
bearing surface, the mounting face including a mounting face recession, the mounting face recession
including an interior surface that is recessed relative
to a major surface of the mounting face that is outside
of the mounting face recession;
a magnetic transducer disposed on the trailing face of the
slider; and
a laser device affixed to the interior surface by a bonding
material, the laser device being at least partially
recessed into the mounting face recession;
wherein the laser device passes through an opening in
the flexure.

7. The disk drive of claim 6, wherein the interior surface includes a metal coating that comprises gold or platinum.

8. The disk drive of claim 6, wherein the bonding material is a solder material.

9. A disk drive comprising:
a disk drive base;
a disk rotably attached to the disk drive base;
an actuator pivotably attached to the disk drive base, the
actuator including an arm;
a suspension assembly attached to the arm, the suspension
assembly including a flexure having a plurality of conductive traces;
a read head mounted on the flexure, the read head including
a slider having an air bearing surface, a trailing face that
is normal to the air bearing surface, and a mounting
face that is opposite but substantially parallel to the air
bearing surface, the mounting face including a mounting face recession, the mounting face recession
including an interior surface that is recessed relative
to a major surface of the mounting face that is outside
of the mounting face recession;
a magnetic transducer disposed on the trailing face of the
slider; and
a laser device affixed to the interior surface by a bonding
material, the laser device being at least partially
recessed into the mounting face recession;
wherein a depth of the mounting face recession is in the
range 0.3 to 0.5 microns, measured from and normal
to an adjacent region of the major surface.

10. A disk drive comprising:
a disk drive base;
a disk rotably attached to the disk drive base;
an actuator pivotably attached to the disk drive base, the
actuator including an arm;
a suspension assembly attached to the arm, the suspension
assembly including a flexure having a plurality of conductive traces;
a read head mounted on the flexure, the read head including
a slider having an air bearing surface, a trailing face that
is normal to the air bearing surface, and a mounting
face that is opposite but substantially parallel to the air
bearing surface, the mounting face including a mounting face recession, the mounting face recession
including an interior surface that is recessed relative
to a major surface of the mounting face that is outside
of the mounting face recession;
a magnetic transducer disposed on the trailing face of the
slider; and
a laser device affixed to the interior surface by a bonding
material, the laser device being at least partially
recessed into the mounting face recession;
wherein the interior surface includes a metal coating;
and
wherein the metal coating comprises a layer of gold
having a thickness in the range 100 nm to 250 nm.

11. The disk drive of claim 8, wherein the solder material defines a solder material thickness in the range 1 micron to 2.5 microns.

12. A disk drive comprising:
a disk drive base;
a disk rotably attached to the disk drive base;
an actuator pivotably attached to the disk drive base, the
actuator including an arm;
a suspension assembly attached to the arm, the suspension
assembly including a flexure having a plurality of conductive traces;
a read head mounted on the flexure, the read head including
a slider having an air bearing surface, a trailing face that
is normal to the air bearing surface, and a mounting
face that is opposite but substantially parallel to the air
bearing surface, the mounting face including a mounting face recession, the mounting face recession
including an interior surface that is recessed relative
to a major surface of the mounting face that is outside
of the mounting face recession;
a magnetic transducer disposed on the trailing face of the
slider; and
a laser device affixed to the interior surface by a bonding
material, the laser device being at least partially
recessed into the mounting face recession;
wherein the mounting face recession defines a plurality
of recession edges, and wherein a maximum clearance between the laser device and a nearest one of the
plurality of recession edges is less than 10 microns.

13. The disk drive of claim 12, wherein the bonding material does not extend beyond any of the plurality of recession edges.

14. The disk drive of claim 6, wherein the suspension assembly further includes a load beam, and wherein the laser device passes through an opening in the load beam.

15. The disk drive of claim 6, wherein the laser device is a sub-mount assembly that includes a laser diode.

16. The disk drive of claim 6, wherein the plurality of conductive traces includes at least first, second, and third conductive traces, the magnetic transducer being electrically connected to at least the first and second conductive traces but not to the third conductive trace.

17. The disk drive of claim 16, wherein the laser device is electrically connected to at least the third conductive trace, but not to the first or second conductive traces.

* * * * *